(12) United States Patent
Croston et al.

(10) Patent No.: US 11,061,557 B2
(45) Date of Patent: Jul. 13, 2021

(54) DYNAMIC SINGLE TOUCH POINT NAVIGATION

(71) Applicant: REscan, Inc., Redwood City, CA (US)

(72) Inventors: John Adam Croston, Redwood City, CA (US); Botond Bognar, Redwood City, CA (US)

(73) Assignee: RESCAN, INC., Redwood City, CA (US)

( * ) Notice: Subject to any disclaimer, the term of this patent is extended or adjusted under 35 U.S.C. 154(b) by 0 days.

(21) Appl. No.: 16/601,444

(22) Filed: Oct. 14, 2019

(65) Prior Publication Data
US 2020/0042169 A1    Feb. 6, 2020

Related U.S. Application Data

(63) Continuation-in-part of application No. 15/919,585, filed on Mar. 13, 2018, now Pat. No. 10,444,985, which is a continuation-in-part of application No. 15/388,935, filed on Dec. 22, 2016, now Pat. No. 10,579,138, which is a continuation-in-part of application No. 15/389,059, filed on Dec. 22, 2016, now Pat. No. 10,089,784.

(60) Provisional application No. 62/863,245, filed on Jun. 18, 2019, provisional application No. 62/470,405, filed on Mar. 13, 2017.

(51) Int. Cl.
*G06F 3/0481*    (2013.01)
*G06F 3/0488*    (2013.01)
*G06F 3/0484*    (2013.01)

(52) U.S. Cl.
CPC ...... *G06F 3/04883* (2013.01); *G06F 3/04815* (2013.01); *G06F 3/04845* (2013.01)

(58) Field of Classification Search
CPC .............. G06F 3/04883; G06F 3/0346; G06F 3/04845; G05D 1/0016; G05D 1/0044; G05D 1/0227; G05D 2201/0211; H04N 5/23203
See application file for complete search history.

(56) References Cited

U.S. PATENT DOCUMENTS 5,883,628 A * 3/1999 Mullaly .............. G06F 3/04815
715/850
2010/0045666 A1    2/2010 Kommann et al.
(Continued)

OTHER PUBLICATIONS

EP18767817.2, EESR dated Jan. 12, 2021.
(Continued)

*Primary Examiner* — Stephen G Sherman
(74) *Attorney, Agent, or Firm* — Rimon Law, P.C.

(57) ABSTRACT

Touchscreen-enabled devices are provided to display images of either real or virtual environments, the devices having at least one user interface including a graphical overlay laid over the images for navigating the environments. The device can interpret gestures made by a single finger of the user on the touchscreen as commands to achieve intended maneuvers such as translations of the point of view and rotations of the point of view within the displayed environment. This allows for one-finger navigation of the environment. The elevational angle of the viewpoint may be tilted above or below horizontal as the viewpoint approaches topographical features within the displayed environment, and may return to horizontal after transitioning to a level surface.

13 Claims, 9 Drawing Sheets

(56) References Cited

U.S. PATENT DOCUMENTS

| | | | | |
|---|---|---|---|---|
| 2014/0066195 A1* | 3/2014 | Matsui | ............... | A63F 13/533 463/30 |
| 2015/0142213 A1 | 5/2015 | Wang et al. | | |
| 2015/0363966 A1 | 12/2015 | Wells et al. | | |
| 2016/0196687 A1* | 7/2016 | Alpert | ................ | G06T 17/05 345/419 |

OTHER PUBLICATIONS

Muszynski, et al., "Adustable Autonomy for Mobile Teleoperation of Personal Service Robots", 2012 IEEE RO-MAN, Sep. 9-13, Paris, France.

Birkenkampf et al., "A Knowledge-Driven Shared Autonomy Human-Robot Interface for Table Computers", 2014 14th IEEE-RAS International Conference on Humanoid Robots, Nov. 18-20, Madrid, Spain.

\* cited by examiner

DYNAMIC SINGLE TOUCH POINT NAVIGATION

CROSS-REFERENCE TO RELATED APPLICATIONS

This application claims the benefit of U.S. Provisional Application No. 62/863,245, filed on Jun. 18, 2019, and entitled "Dynamic Single Touch Point Navigation"; this application is also a continuation-in-part of, and claims the benefit of, U.S. Non-provisional patent application Ser. No. 15/919,585, entitled "Computing Device Responsive To Contact Gestures", scheduled to be issued as U.S. Pat. No. 10,444,985; said U.S. Non-provisional patent application Ser. No. 15/919,585 in turn claims the benefit of U.S. Provisional Patent Application No. 62/470,405 filed on Mar. 13, 2017, and entitled "Navigation System"; said U.S. Non-provisional patent application Ser. No. 15/919,585 is, in turn, a Continuation-in-Part of U.S. patent application Ser. No. 15/388,935 filed on Dec. 22, 2016 and entitled "Head-Mounted Sensor System", and a Continuation-in-Part of U.S. patent application Ser. No. 15/389,059 also filed on Dec. 22, 2016 and entitled "Head-Mounted Mapping Methods", now U.S. Pat. No. 10,089,784. The disclosures of all of the prior-filed applications identified above are incorporated herein by reference.

BACKGROUND

Field of the Invention

The present invention is in the field of hand-held computing devices and more particularly to their use for displaying and navigating within representations of real and virtual environments.

Related Art 2D and 3D representations of virtual environments are well known in video games, for example, where one or more joysticks are used to navigate, for example, one joystick can be used to advance, retreat, and turn left and right. Similar controls have been adapted to the touchscreens of mobile devices.

SUMMARY OF THE INVENTION

The present invention is directed to a computing device comprising a touchscreen display and logic including a micro-processor. Exemplary computing devices include hand-held devices as well as stationary devices. In various embodiments, the computing device further comprises an I/O configured to communicate with external devices via a communication channel and/or an image storage configured to store a representation of a navigable environment. Devices of the present invention optionally can also comprise an image source configured to generate information sufficient to create the representation of the navigable environment.

The logic is configured to display an image of a navigable environment on the touchscreen display, the image characterized by a viewpoint having a position in the navigable environment and an angle in the navigable environment. The navigable environment comprises a virtual reality environment, a game environment, or a real environment in various embodiments. The logic is further configured to receive touch information from the touchscreen display and filter the touch information to identify contact gestures, each contact gesture having an origination point on the display. In some embodiments, the logic is configured further to, for contact gestures having an origination point within a first part of the touchscreen display, vary the image on the touchscreen display to change the position of the viewpoint of the image. In some embodiments of the invention, the logic is also configured to, for contact gestures having an origination point within a second part of the touchscreen display that does not overlap with the first part of the touchscreen display, vary the image on the touchscreen display to change an angle of the viewpoint of the image.

In various embodiments, the logic is further configured to overlay a first symbol over the image of the navigable environment, where the first symbol is aligned with the first part of the touchscreen display. In some of these embodiments, the logic is further configured to overlay a second symbol over the image of the navigable environment, the second symbol being aligned with the second part of the touchscreen display. The logic can be further configured, for contact gestures having the origination point within the first part of the touchscreen display and including a swipe, to move the first symbol from a location where it is aligned with the first part of the touchscreen display and along a path traced by the swipe.

In some embodiments in which the device is hand-held, the device includes an orientation sensor and the logic is further configured to receive orientation information from the orientation sensor, switch the display of the image of the navigable environment between landscape mode and portrait mode based on the orientation information, and overlay a first symbol over the image of the navigable environment, the first symbol being aligned with the first part of the touchscreen display. Further, the logic is still further configured to, when the display of the image of the navigable environment is switched to the landscape mode, overlay a second symbol over the image of the navigable environment, the second symbol being aligned with a third part of the touchscreen display within the second part of the touchscreen display. In these embodiments, the logic is further configured, while in the landscape mode, to filter the touch information to identify contact gestures that originate within the third part of the touchscreen display, and to vary the image on the touchscreen display to change the angle of the viewpoint of the image in response thereto.

In various embodiments, the second part of the touchscreen display comprises the entire area of the touchscreen display outside of the first part of the touchscreen display. Also, in some embodiments, the logic is further configured, for contact gestures including a swipe and having the origination point within the second part of the touchscreen display, to vary the angle of the viewpoint proportionally to a length of the swipe. The logic may be further configured, for contact gestures having the origination point within the first part of the touchscreen display, to vary the position of the viewpoint proportionally to a length of a touch contact time on the touchscreen display. The logic can further be configured, for contact gestures having the origination point within the first part of the touchscreen display and having a curved swipe, to vary the position of the viewpoint along a curve.

In various embodiments, the logic is further configured to overlay a mini-map of the navigable environment over the image of the navigable environment. In some of these embodiments the logic is further configured to filter the touch information to identify contact gestures that comprise a tap, and further configured to provide the mini-map in response to contact gestures that comprise the tap. Also, in some embodiments in which the logic is further configured to overlay the mini-map, the logic is further configured to filter the touch information to identify contact gestures that comprise a tap, and further configured to save the image in response to contact gestures that comprise the tap.

In further embodiments in which the computing system comprises a hand-held device, the hand-held device includes an orientation sensor and the logic is further configured to receive orientation information from the orientation sensor and switch the display of the image of the navigable environment between landscape mode and portrait mode based on the orientation information. In these embodiments the first part of the touchscreen display can be positioned within an area of the touchscreen display and the logic can be further configured to, when in the portrait mode, position the first part of the touchscreen display such that it is spaced apart from a first edge of the touchscreen display by a first distance, and spaced apart from a second edge of the touchscreen display, which is longer than the first edge, by a second distance, and when in the landscape mode, position the first part of the touchscreen display such that it is spaced apart from the first edge of the touchscreen display by the second distance, and spaced apart from the second edge of the touchscreen display by the first distance.

The present invention also provides a telepresence system comprising a mobile telepresence robot and a controller device. The telepresence robot is steerable in two dimensions in a real environment in response to received commands. The robot includes a camera, a first I/O configured to communicate via a communication channel, and logic configured to stream video from the camera through the I/O and over the communication channel. The controller device includes a second I/O configured to communicate with the telepresence robot via the communication channel, a touchscreen display, and logic including a micro-processor. The logic is configured to display the streaming video on the touchscreen display, where the video is characterized by a viewpoint having a position in the real environment. The logic is further configured to receive touch information from the touchscreen display, filter the touch information to identify contact gestures each having an origination point on the display, and for contact gestures having an origination point within a first part of the touchscreen display, send a command to the telepresence robot to move within the real environment to change the position of the viewpoint of the video.

In some embodiments of the invention, a single touch navigation system is configured such that a view of the space on a display screen mimics a person's actual view of the space being displayed. These features may include changing a view point and/or angle of view as would occur in real life as a person traverses (e.g., walks) through a space.

The view seen on a display screen is typically a function of both the angle of view within the displayed space as well as the position of the view point within the space. The viewpoint is the point within the environment from which the view occurs, i.e., from which the view is centered. In order to navigate within video games, for example, it has been known for a player to be able to change both the position of the viewpoint and the angle of view within an environment. However, this has typically been done using two separate inputs—one input to change the position of the view within the space, and another to change angle of view independent of position. This is inconvenient on a display of a handheld device, such as found in a smartphone.

Various embodiments discussed herein are included in systems that include a single touch control which may be operated by a single digit/finger of a user to simultaneously control both the position of the viewpoint and the angle of view within an environment. Some embodiments of the invention are distinguished by automatic changes in view angle responsive to the environment of the space. Features of the environment may cause a change in the relationship between the view point and angle of view. For example, in some parts of the environment, angle of view may be independent of view point, while in other parts of the environment (proximate to a feature) the angle of view is dependent on the view point.

Some embodiments include display logic configured to automatically change an angle of view as the viewpoint (i.e., the point from which the view is simulated) changes. Thus, a user can use a single touch control to navigate the user's viewpoint within 3D digital environments displayed on touchscreen-enabled devices.

Some embodiments include a computing device that includes a touchscreen display and logic having a micro-processor. The logic of the computing device is configured to display an image of a navigable environment on the touchscreen display. The image is displayed from a viewpoint having a position in the navigable environment, along an angle in the navigable environment. The logic is configured to receive touch information from the touchscreen display, and to filter the touch information to identify contact gestures each having an origination point on the display. The logic is configured to determine both the origination point on the touchscreen display where a contact gesture begins, as well as an endpoint on the touchscreen display where the contact gesture ends. The logic derives a direction from the origination point to the endpoint, and the logic varies the image on the touchscreen display to change the angle of the viewpoint image to match such derived direction. The logic also varies the image on the touchscreen display to change the position of the viewpoint of the image in the derived direction.

In some embodiments, the logic is further configured to determine that the endpoint is still being touched, and to continue varying the image on the touchscreen display to change the position of the viewpoint of the image along the derived direction for so long as the endpoint is still being touched.

In various embodiments of the invention, a user's view point while in motion is automatically changed so as to mimic real life "head bobbing" when a user walks in real life. In conjunction with such "head bobbing", the axis of the viewer's viewpoint moves up and down, and may simultaneously swing slightly from left to right and back, due to corresponding movements of the user's head in the process of walking. In various embodiments, this "head bobbing" movement is dependent on how fast the viewpoint is moving (simulating how fast a user would be walking or running); "head bobbing" may also be a function of the height of the viewpoint (e.g., the eyelevel of an avatar) or the like. In various embodiments, this movement is in the range of +/−1 to 4 cm in the up/down direction (or in the range of 1%-4% of the height of a person) and/or in the range of +/−1 to 4 cm in the lateral (left/right) direction, relative to distances as measured in the coordinates of the virtual space.

In various embodiments, a user's elevational angle of view, or tilt, is automatically changed when the user view point approaches specific features within the virtual environment. Topographical features of the virtual environment that might trigger a change in the elevational angle of view can include a change in floor slope (e.g., ramps), approaches to stairs, a step, a ladder, a hole, and/or the like; these stairs, steps, ladders, or the like, may lead upwardly or downwardly. In various embodiments, the elevational angle of view can automatically change when the position of the viewpoint approaches within a threshold of 1 to 4 meters from such topographical feature. The amount of elevational angle change is optionally dependent on the topographical feature being approached. For example, a greater change in the elevational viewpoint angle may occur for steeper stairs. In various embodiments, the angle of change may be +/−1, 3, 5, 8 or 10 degrees (or any range therebetween). For example, assuming that a ramp or stairway inclines upwardly at an angle of thirty degrees, the elevational viewing angle may be tilted upwardly, upon approaching within 2.5 meters from the edge of such ramp or stairway, at an angle of 35 degrees, i.e., the upward angle of incline of the ramp or stairway, plus five degrees.

Similarly, in various embodiments, the user's elevational angle of view may be tilted downwardly when the position of the viewpoint reaches within a threshold distance from the edge of a downward-going ramp or stairs. As an example, when the viewpoint position reaches within 2.5 meters of the beginning of a downwardly-inclined ramp or stairs, the elevational viewing angle can automatically be tilted downwards. If the downwardly-inclined ramp or stairs is inclined downwardly at an angle of 30 degrees, then the angular degree of downward tilting of the elevational viewing angle might be tilted 34 degrees below the horizontal, i.e., four degrees beyond the incline axis of the ramp or stairs.

In various embodiments, the elevational angle of the viewpoint may be automatically adjusted back to a level/horizontal attitude after the position of the viewpoint has finished traversing, and transitioned from, the topographical feature that prompted the change in elevational viewing angle. For example, after "going down" a set of stairs, the elevational angle of the viewpoint may return to being parallel with the floor surface as the user continues to walk through the 3D digital environment.

In various embodiments, a user's angle of view and/or position of view point is responsive to presence or movement of an object in the virtual environment. For example, a rapid movement can automatically attract a user's view (changing angle of view and/or view point) in a simulated environment, just as a rapid movement would attract attention in real life.

DETAILED DESCRIPTION

The present invention is directed to devices with touchscreen user interfaces that are able to display images on the touchscreen that can be 2D or 3D representations of either real or virtual environments, and also directed to a graphical overlay that is displayed as if laid over the images on the touchscreen. The device can interpret contact gestures made by the user on the touchscreen as commands to navigate through the environment. The graphical overlay guides the user as to where to place contact gestures on the touchscreen in order to achieve intended maneuvers. Maneuvers can include, for example, translations of the point of view, rotations of the point of view, and combinations thereof, within the displayed environment. The device can be a hand-held device, in some embodiments, but can also be a device that includes a fixed display, such as one that includes a display mounted on a wall.

More specifically, the graphical overlay can comprise only a single symbol, such as a circle, while in other embodiments the overlay comprises two symbols. In single symbol embodiments, contact gestures that originate within the area of the display marked by the symbol are differentiated from those contact gestures originating from outside of the symbol. In two symbol embodiments, contact gestures that originate within one symbol are differentiated from those contact gestures originating within the other symbol. In either case, the differentiated contact gestures control translation and rotation, respectively. With devices of the present invention, a user is provided with a user interface to navigate a displayed environment using only a single finger. The resulting user experience feels like a proper walk through as if it were in a computer game.

Figure 1:
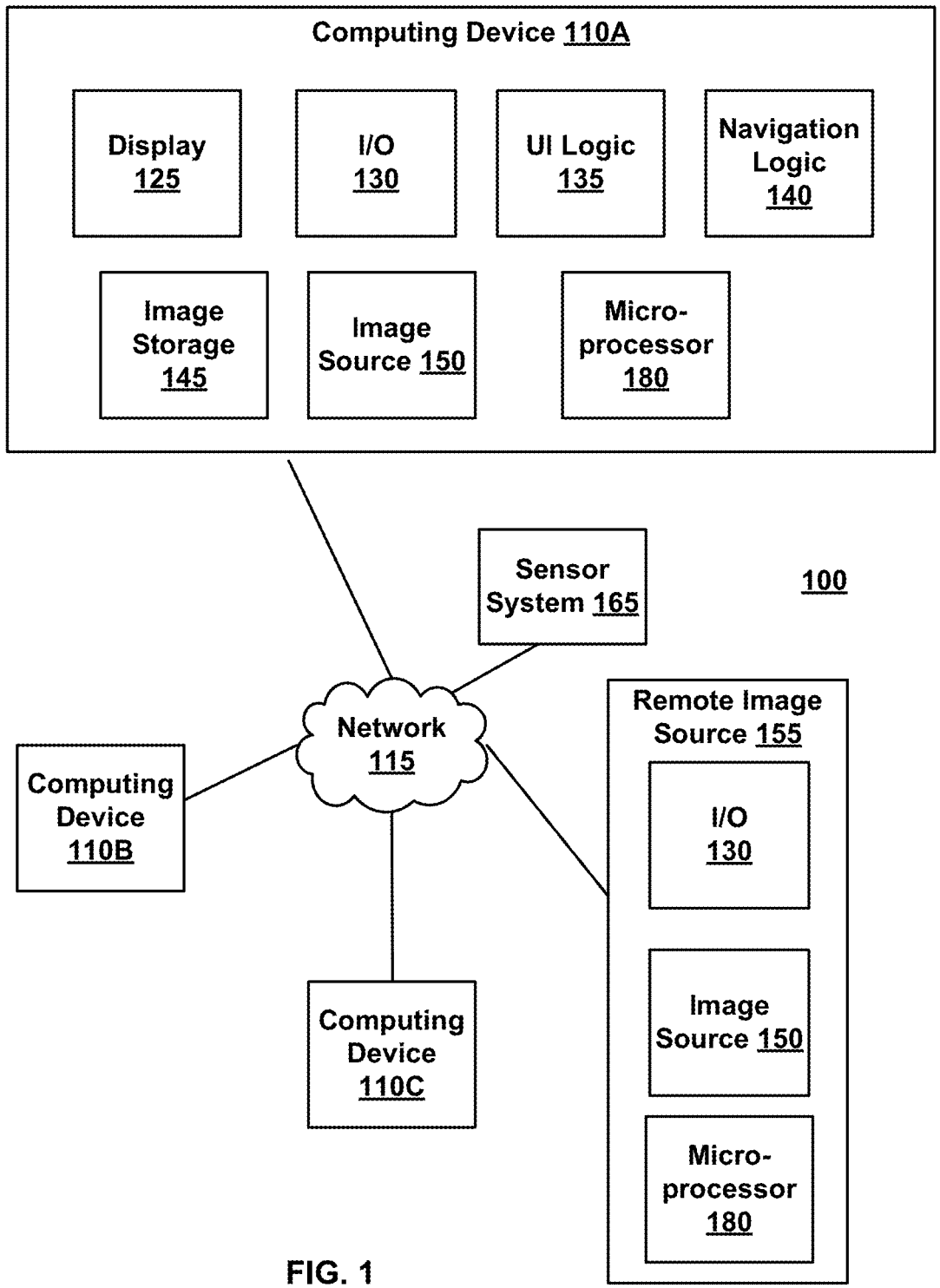
FIG. 1 illustrates a communication network including at least one computing device, according to various embodiments of the invention.

FIG. 1 illustrates a Communication System 100 including at least one Computing Device 110A, according to various embodiments of the invention. Communication System 100 optionally includes additional Computing Devices 110B, 110C, etc. Computing Devices 110 are optionally configured to communicate via a Network 115. The Network 115 can include the Internet, a cellular network, a wireless network, a local area network, and/or the like, and combinations thereof.

Computing Device 110A includes a touchscreen Display 125 able to detect a contact of a digit (e.g., thumb or finger) of a user on the surface of the Display 125, and exemplary Computing Devices 110A include smartphones and tablets, as well as other types of computing systems with touchscreens like laptop computers and systems having wall-mounted touchscreens displays. Contact gestures, as used herein, are interactions of the digit with respect to the Display 125 that include either touch or close enough proximity to the Display 125 to be recognized thereby. Exemplary contact gestures include a tap (brief touch), a double tap, a touch at a first point and swiping (maintaining contact) to a second point, a touch and hold at a specific point, and/or the like. A path traced by the user's digit across the surface of the Display 125 can be part of a contact gesture. Other contact gestures can include an arch, circle, etc. Dragging, as used herein, is swiping where an object being displayed on the Display 125 moves with the digit during the swipe. It should be understood that swiping, as used herein, does not require any kind of continuous motion is one direction or any kind of speed of the stroke, rather it refers to any sustained contact over some path, and so excludes a touch and release at a single location.

Computing Device 110A optionally further includes an I/O (input/output) 130 configured to communicate with external devices via a communication channel, e.g., Network 115. I/O 130 can include a communication port, a wireless communication circuit, etc.

Computing Device 110A optionally further includes an Image Storage 145, a non-transitory storage device such as RAM or Flash memory, for storing a representation of a navigable environment, such as through a collection of stored images, like photos of a real environment. Real and virtual environments can also be represented through stored information sufficient to construct the navigable environment, such as a 3D wireframe and a set of textures assigned to the various portions of the wireframe. As such, the navigable environment can comprise, for example, a virtual environment, a game environment, and/or a real environment. Image Storage 145 optionally includes data structures specifically configured to store images and/or a geometry of the environment.

As one example, images of a real environment can be used by a remote user holding the Device 110A to maneuver a distant telepresence robot through a real environment. In these embodiments, Image Storage 145 is not necessary where the images comprise streaming video received from the telepresence robot, though Image Storage 145 can be provided to buffer streaming video and/or record the streaming video for later playback. The representation of the navigable environment may also be generated on Computing Device 110A and/or received via Network 115 from an external device or source.

Computing Device 110A further includes User Interface (UI) Logic 135 and Navigation Logic 140. UI Logic 135 continuously receives touchscreen input in the form of touch information from the Display 125 while Navigation Logic 140 provides the navigable environment to the Display 125 together with one or more navigation symbols. These navigation symbols are overlaid over the displayed image of the navigable environment, and are used to indicate different functions (e.g., properties or functionalities) of different parts of the Display 125. Navigation symbols can include buttons, menu items, circles, icons, etc. as described further herein. Navigation symbols can be opaque to semi-transparent with respect to the image below. Navigation Logic 140 is optionally configured to present a different number of navigation symbols depending on an orientation of the Display 125 (e.g., portrait or landscape orientation/mode). Touch information can include identification of the pixels being touched, for example.

UI Logic 135 is configured to filter the received touch information to determine occurrences of contact gestures, and their locations, relative to the positions of the Symbols 210, 215 or any other symbols. When a contact gesture is identified by a filter, the information about the gesture is passed to the Navigation Logic 140. When an orientation of the Display 125 is switched by Navigation Logic 140, the Navigation Logic 140 updates the UI Logic 135 so that the filters can be updated to the new configuration. Each symbol 210, 215 is aligned with a part of the touchscreen Display 125, and the two parts do not overlap in embodiments where both Symbols 210, 215 are used. As used herein, "aligned with" means that the Symbols 210, 215 each overlay a number of pixels within the part of the Display 125 such that the pixels are coextensive or nearly coextensive with the Symbol 210, 215. If not completely coextensive, the part of the Display 125 that is aligned with a Symbol 210, 215 may be larger or smaller than the Symbol 210, 215 itself on the Display 125.

Figure 2A:
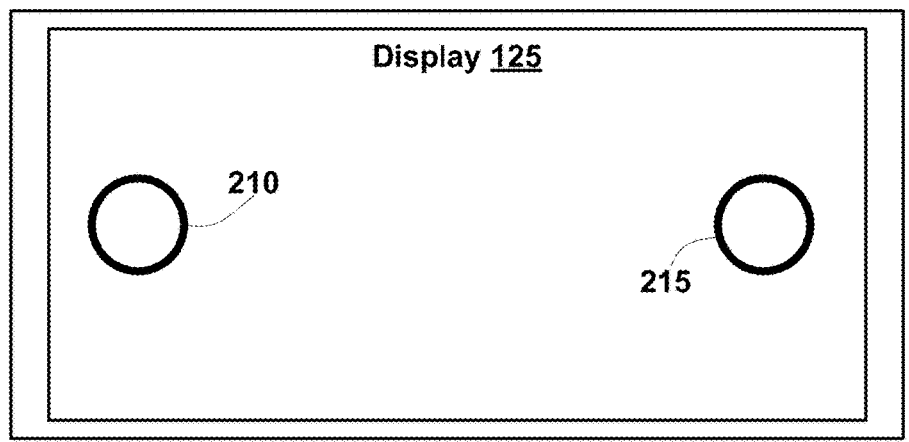
FIGS. 2A, 2B and 2C illustrate landscape and portrait modes of a user interface, according to various embodiments of the invention.
Figure 2B:
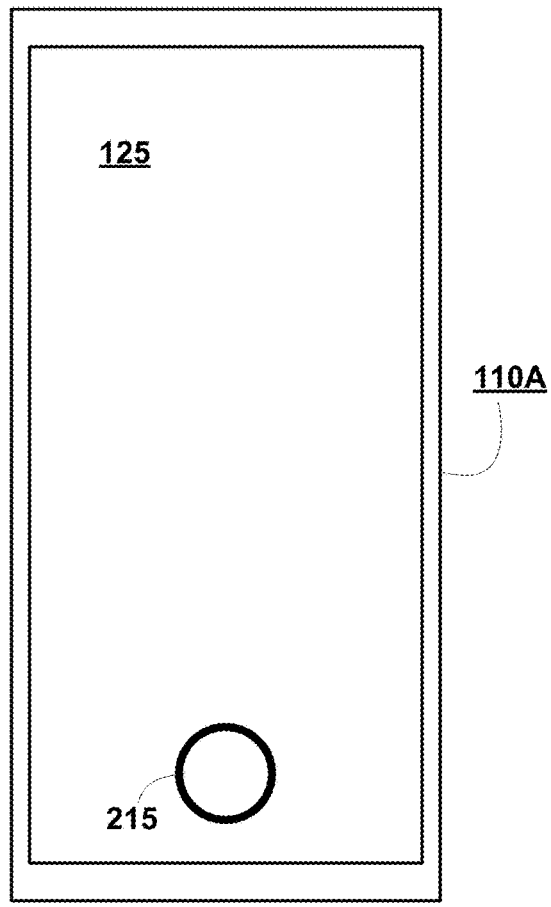
Figure 2C:
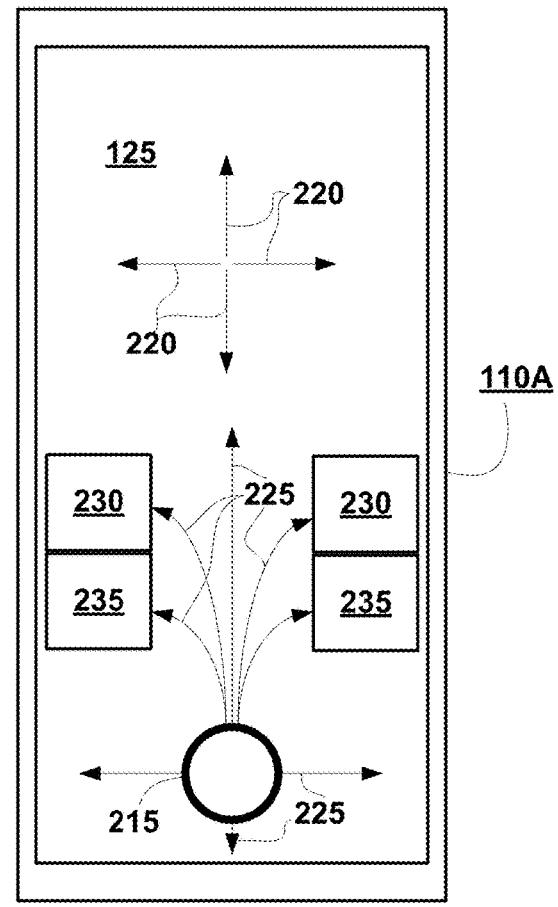
Figure 3:
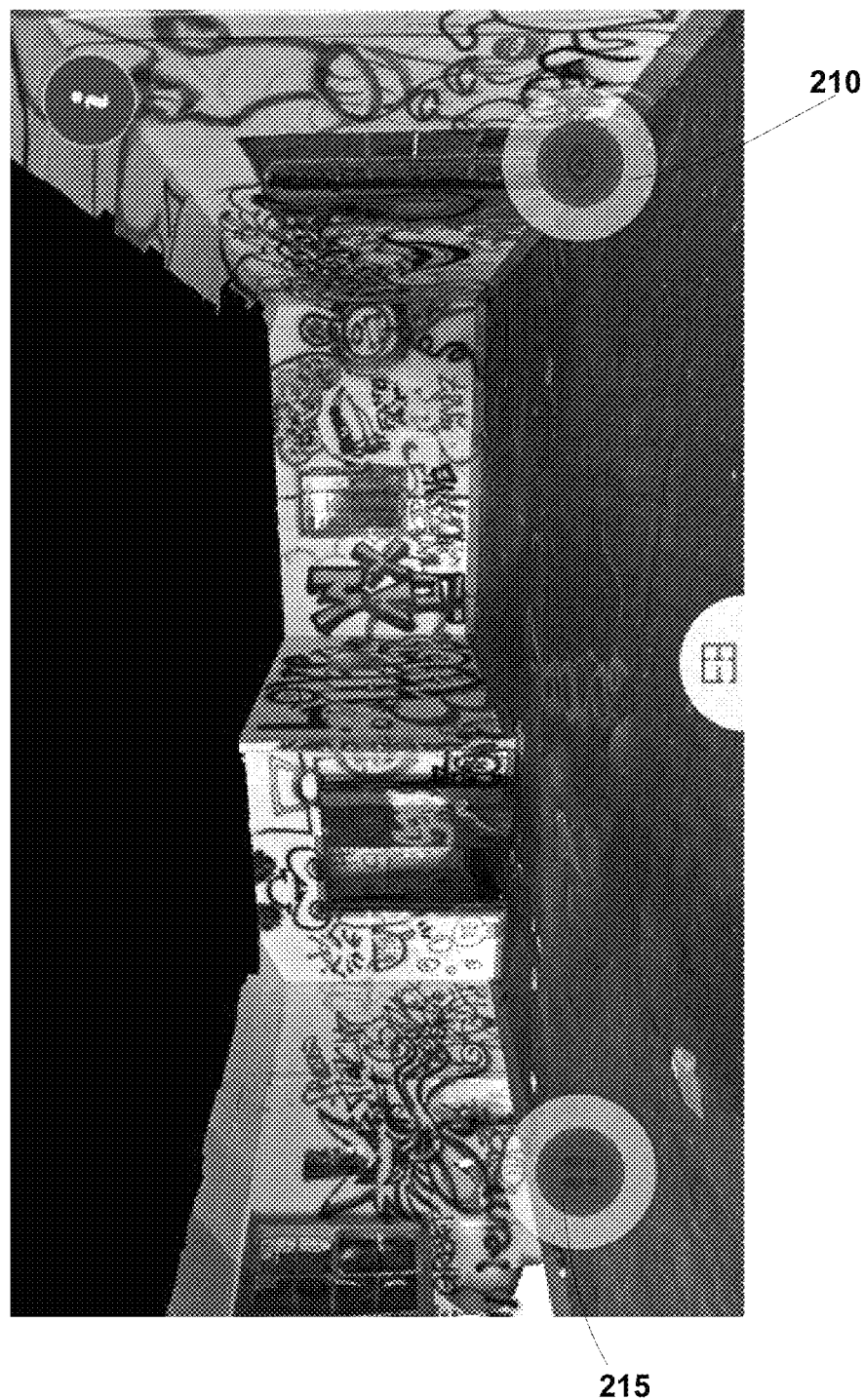
FIG. 3 Illustrates a screen capture of the user interface of FIG. 2A, according to various embodiments of the invention.

An exemplary Computing Device 110A is illustrated in FIGS. 2A-2C which show the Computing Device 110A in both the landscape (FIG. 2A) and portrait (FIGS. 2B and 2C) orientations. In the illustrated embodiment the Display 125 has a rectangular touch-sensitive display area in which the navigable environment is shown. For clarity, no such image is shown in FIGS. 2A-2C, only the Navigation Symbols 210, 215 which are overlaid above the image of the environment. FIG. 3 shows a screen shot of an environment overlaid with Symbols 210, 215 and a "mini-map" of the broader navigable environment.

In various embodiments, the Computing Device 110A includes an orientation sensor and the Navigation Logic 140 receives orientation information from the orientation sensor in order to automatically switch the Display 125 between portrait and landscape modes based on how the Computing Device 110A is held. In these embodiments, Symbols 210, 215 can be displayed by the Navigation Logic 140 to the left and right of center in the landscape orientation, while only one Symbol 215 is provided below center in the portrait orientation, as illustrated. Stationary displays, such as wall-mounted touchscreens, can employ either a single Symbol 215, or both, and can be switched therebetween in some embodiments.

Navigation Logic 140 is optionally similarly further configured to provide a partial or complete "mini-map" of the navigable environment on Display 125, that is, a representation of the navigable environment overlaid over a portion of the image as in FIG. 3. In some embodiments, this mini-map is optionally accessed by a contact gesture, such as a double tap on a specific part of Display 125, e.g., double tapping on the part of Display 125 represented by Symbol 215.

Navigation Logic 140 is optionally further configured to provide information regarding an object in the displayed image of the environment in response to a contact gesture, such as a touch and release. For instance, Navigation Logic 140 can include logic that maintains a register of selectable objects that are shown in the image presently displayed on the Display 125, some information about each object, and the coordinates of the pixels within the Display 125 corresponding to each such object, so that when the contact gesture is received from pixels corresponding to an object, the Navigation Logic 140 can add to the overlay the information for that object in an area of the Display 125 proximate to the selected object.

In other embodiments the Navigation Logic 140 is configured to employ an image analysis to identify objects in the environment, such as a real environment, like people and things within the image presently displayed on the Display 125. In some of these embodiments the Navigation Logic 140 can respond to a contact gesture by initiating the image analysis in an area around the pixels that were touched and if something is positively identified in the analyzed portion of the image, then the Navigation Logic 140 can display information stored for that object or person, or can search for information, and provide a brief summary as information in the overlay proximate to whatever was identified.

Navigation Logic 140 is optionally further configured to save the image presently displayed on the Display 125 in response to a contact gesture, the image being a screen shot but without the overlay provided by the present invention. Navigation Logic 140 is optionally further configured to reorient the displayed portion of the navigable environment in response to a contact gesture, for example, a contact gesture can reorient the displayed portion of the navigable environment to show the opposite (back) view.

Navigation Logic 140 is further configured to control both the angle and the position of a viewpoint, that is, change the location within the environment from which the environment is presented to the Display 125 as well as change the direction of the view from that location. "Position of a viewpoint" is the particular location, or point, in the environment from which the view originates. "Angle of a viewpoint" is the direction, in a coordinate system of the environment, in which the environment is observed from the position of the viewpoint. Changing the angle and position of the viewpoint has the effect of panning and zooming, analogous to a person at the position of the viewpoint turning their head or moving within the navigable environment.

As noted above, Navigation Logic 140 is further configured to receive from UI Logic 135 contact gestures and to recognize some as commands to change the position of the viewpoint, and to recognize other contact gestures as commands to change the viewpoint. Both types of contact gestures, in some embodiments, share in common that the gesture originates on a first part of the Display 125 and extends to another part of the Display 125 before ending. In some instances, a filter may recognize a contact gesture as initiated and pass the information to the Navigation Logic 140 before the contact gesture is completed. Accordingly, the Navigation Logic 140 can respond to a contact gesture and change the display of the environment while the contact gesture is still in progress.

The first and/or second parts of the display are optionally indicated by Symbols 210, 215. In some embodiments, a touch that originates at Symbol 210 is used to control the angle of the viewpoint while a touch that originates at Symbol 215 is used to control the position of the viewpoint itself. For instance, touching at Symbol 210 and swiping up results in an upward change in the angle of the viewpoint, touching at Symbol 210 and swiping right results in a rightward change in the angle of the viewpoint, etc. Touching at Symbol 215 and swiping upward results in movement of the position of the viewpoint forward in the navigable environment, touching at Symbol 215 and swiping right results in movement of the position of the viewpoint to the right, etc. The embodiments represented by FIG. 2A can be particularly useful when Computing Device 110A is a handheld device and held with two hands so that each thumb is used to touch the Symbols 210 and 215 respectively. In some embodiments, touching at Symbol 210 serves to select the Symbol 210 such that the Symbol 210 is dragged along with any swipe that originates therein. At the end of the contact gesture, the Symbol 210 is returned to its home location on the Display 125.

Display 125 is shown in FIG. 2B in the portrait mode. In some embodiments, only one of Symbols 210, 215 is provided by Navigation Logic 140 when in the portrait mode. The operations of UI Logic 135 and Navigation Logic 140 are, thus, optionally dependent on the orientation of Computing Device 110A. The functionality of different parts of Display 125 may change depending on the orientation of Display 125. In the example shown, Symbol 215 represents the part of Display 125 from which the position of the viewpoint is manipulated. A contact gesture that originates in this part of Display 125 and swipes outward therefrom is interpreted by UI Logic 135 as a command to change the position of the viewpoint within the environment. Optionally, a touch that originates in any other part of Display 125 and swiped is interpreted by UI Logic 135 as a command to change the angle of the viewpoint. Thus, a person can use a single hand to hold Computing Device 110A and use the thumb of that hand to change viewpoint position by touching at Symbol 215, and use their thumb to swipe elsewhere on Display 125 to change the angle of the viewpoint.

FIG. 2C illustrates examples of swiping motions that may occur on Display 125 in the landscape mode. Swipes 220 that originate from outside of the Symbol 215 are used to change the angle of the viewpoint, and in some embodiments this includes the entire touch-sensitive surface of the Display 125 that is outside of the Symbol 215, or can be in just a portion of the Display 125 outside of the Symbol 215. The length or strength of a Swipe 220 can optionally be used as a means of control, for instance, the amount of change of the angle of the viewpoint can be proportional to the length of the swipe 220.

In FIG. 2C, Swipes 225 that originate at the part of the Display 125 indicated by Symbol 215 are used to change the position of the viewpoint. In various embodiments, swiping can be along a straight or a curved path. The path of a swipe optionally is interpreted by UI Logic 135 as a contact gesture having a specific meaning. The degree of curvature of a swiping gesture is optionally used to control a curvature of a path along which viewpoint position is changed for the displayed environment. For example, a gesture that originates at Symbol 215 and curves to the area indicated by Boxes 230 in FIG. 2C results in a position of the viewpoint change forward with a gradual turn (right or left). In contrast, a gesture that originates at Symbol 215 and curves to the area indicated by either Box 235 results in a position change forward with a relatively sharper turn. A gesture with an even greater curvature may result in a U-turn in viewpoint position. This simulates a person sharply turning around, analogous to a 180-degree rotation of the angle of the viewpoint. Boxes 230 and 235 are not necessarily visible on Display 125 but merely represent, for the sake of illustration, regions of the Display 125. As such, boxes 230 and 235 may represent either discrete regions or a continuum in which a large number of alternative gestures may terminate.

In some embodiments, a contact gesture originating from the area of Display 125 indicted by Symbol 215 can be held on the Display 125 at the end of the gesture. In other words, if the user leaves their digit on Display 125 after swiping a distance from Symbol 215, the resulting change (rate and direction) in the position of the viewpoint will continue until the digit is lifted from Display 125. Where motion continues until the digit is lifted, the amount of viewpoint position change is dependent on the length of time the digit is in contact with Display 125.

Note that the part of the Display 125 used to control the angle of the viewpoint includes a greater amount of the Display 125 in portrait mode relative to landscape mode. Specifically, a ratio of an area of the part of the display for viewpoint change to an area of the first part of the display for position change is greater in portrait mode relative to landscape mode.

Computing Device 110A optionally further includes an Image Source 150. Image Source 150 can include, for example, rendering logic configured to generate the information sufficient to construct the navigable environment, like images or a 3D wireframe and a set of textures, that are stored in the Image Storage 145. Computing Device 110A further includes a Microprocessor 180 configured to execute at least the Navigation Logic 140, but also one or more of the UI Logic 135, Image Source 150, I/O 130 and any other logic herein that requires a microprocessor to implement coded instructions.

The "logic" discussed herein includes hardware, firmware, and/or software stored on a non-transient computer readable medium. UI Logic 135 and Navigation Logic 140 may be used to navigate a virtual reality environment, to navigate a game environment, to navigate a telepresence robotic device in the real world, and/or the like. It should be noted that the divisions made here between UI Logic 135 and Navigation Logic 140 are exemplary, and the functions they provide can be integrated into a singular logic or distributed across three or more logics.

Communication System 100 optionally further includes a Remote Image Source 155 in communication with Computing Device 110A across Network 115. In some embodiments, the information sufficient to construct the navigable environment that is stored in Image Storage 145 is generated at least in part by Remote Image Source 155. Remote Image Source 155 can include embodiments of I/O 130, Image Source 150, Microprocessor 180, and/or the like.

Communication System 100 optionally further includes a Sensor System 165 configured to generate data characterizing a real-world navigable environment from which the information sufficient to construct the navigable environment can be further generated. Sensor System 165 can range from one or more optical cameras to more complex systems able to gauge distance as well as to collect images such as those described in U.S. patent application Ser. Nos. 15/389,059 and 15/388,935. In some embodiments, Computing Device 110A includes Sensor System 165.

Figure 4:
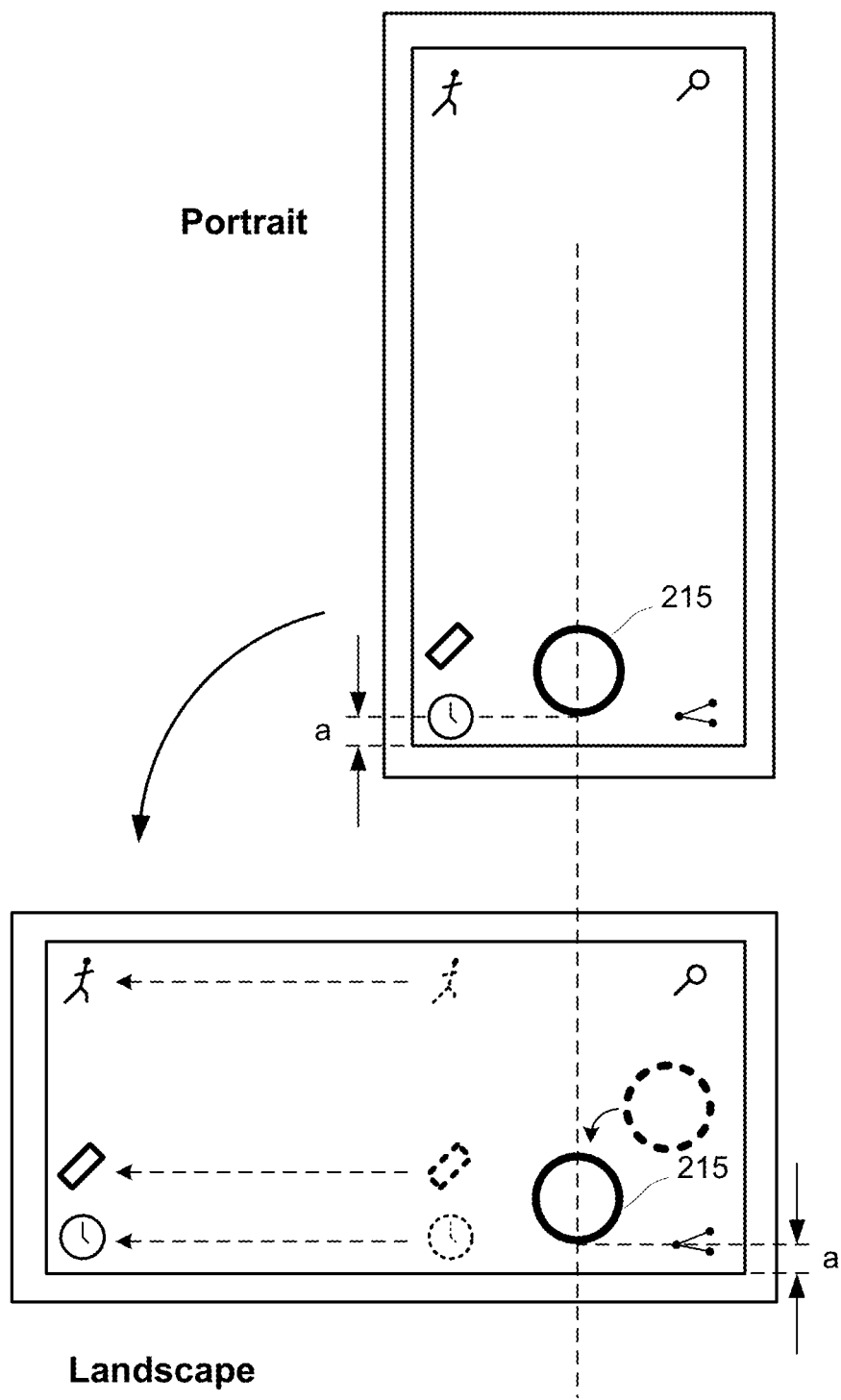
FIG. 4 illustrates exemplary navigation symbol configurations in portrait and landscape modes, according to various embodiments of the invention.

FIG. 4 illustrates exemplary navigation symbol configurations for portrait and landscape modes, respectively. In the portrait mode, in these embodiments, the Symbol 215 is positioned along the vertical centerline of the Display 125 and spaced from the bottom edge of the Display 125 by a gap, a, as shown. The Symbol 215 is also spaced from the right edge of the Display 125 by another gap. In the landscape mode, Symbol 215 is likewise spaced from the bottom and right edges of the Display 125 by the same gaps. Other navigation symbols that may be present as part of the overlay in the portrait mode are similarly repositioned to maintain their respective gaps relative to the nearest two sides of the Display 125, as further illustrated.

Referring again to FIGS. 1 and 2B, computing device 110A may alternatively be configured to operate as a single touch control in a manner now to be described. Display 125 may superimpose symbol 215 over a displayed image of a navigable environment. As already explained above, the displayed image presents a viewpoint having a position in the navigable environment and an angle in the navigable environment. A user touches the user's finger to display 125 within symbol 215 at a starting point, i.e., an origination point. The display 125 thereby receives touch information from display 125, and microprocessor 180 and/or navigation logic 140 filters such touch information to identify a corresponding contact gesture at the origination point on the display 125 where the contact gesture begins. The user then slides his or her finger slightly in the direction that the user wishes to move; the user's finger then rests on an endpoint on the touchscreen display where the contact gesture ends. Microprocessor 180 compares the endpoint with the origination point to derive the direction from the origination point to the endpoint. Microprocessor 180 then causes display 125 to change the angle of the viewpoint image to match such derived direction. Microprocessor 180 also varies the displayed image to move the position of the viewpoint of the image in the derived direction.

Assuming that the user keeps his or her finger at the endpoint of the gesture on display 125, display 125 senses that it is still being touched. In response to such continued touching, microprocessor 180 continues to vary the image on the touchscreen display by further changing the position of the viewpoint of the image along the derived direction for so long as the endpoint is still being touched. Thus, the user can simply keep his or her finger at the endpoint, and the displayed viewpoint will continue to move in the selected direction.

If a user desires to change course, the user may simply shift his or her finger from the previous endpoint to a new endpoint. In this case, the previous endpoint is treated as the new origination point, and the new location where the user's finger comes to rest is treated as the new endpoint. A new direction is derived, and so long as the user maintains his or her finger at the new endpoint, the viewpoint will continue to move along the newly selected direction.

Figure 5:
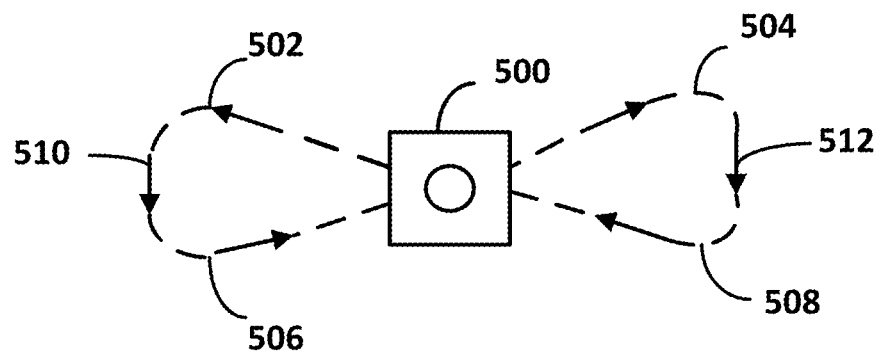
FIG. 5 illustrates movement of a viewpoint in space resembling head bobbing due to simultaneous vertical and horizontal movements of a user's head while moving forward, according to various embodiments of the invention.

As noted above, one aspect of the present invention is to simulate so-called "head bobbing" as the view point moves along a selected path within the navigable environment. In FIG. 5, viewer 500 is an icon of a video camera simulating the creation of the viewpoint that is displayed to a user on display 125. In FIG. 5, the dashed arrows forming a "figure-8" path illustrate the movement of a person's head as they take alternating steps with his or her left and right feet. As a first step is taken, the center of the viewpoint represented by viewer 500 shifts to the right upwardly towards point 504 and laterally toward point 512. Continued shifting of the person's weight shifts viewer downwardly toward point 508 before returning to the starting position. As the second step is taken, the center of the viewpoint represented by viewer 500 shifts to the left upwardly towards point 502 and laterally toward point 510. Continued shifting of the person's weight shifts viewer downwardly toward point 506 before returning to the starting position. The frequency of the cycle shown in FIG. 5 is proportional to the speed at which a person is moving through the environment; hence, the frequency of the cycle shown in FIG. 5 should be proportional to the speed at which the position of the viewpoint is moving through the displayed environment.

Figure 6:
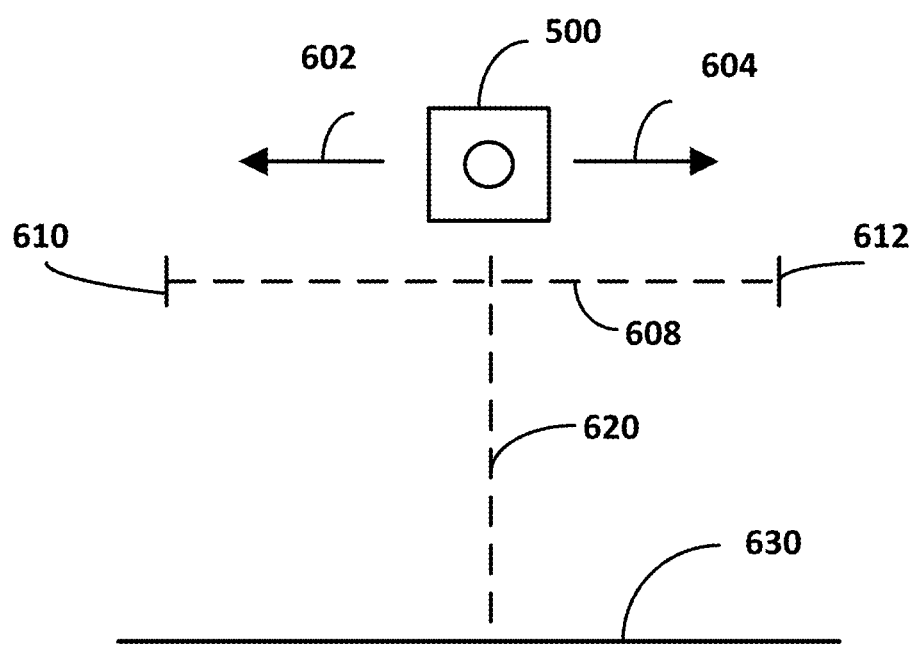
FIG. 6 illustrates movement of the viewpoint of FIG. 5 in a horizontal plane (side-to-side) along a horizontal axis according to various embodiments of the invention.

FIG. 6 illustrates "head-bobbing" movement of the viewpoint represented in FIG. 5 isolated in the lateral, horizontal (i.e., side-to-side) direction along a horizontal axis. When at rest, viewer 500 is centered about vertical axis 620 above a lower reference plane, e.g., ground level 630. Viewer 500 alternately moves to the right, represented by arrow 604, and to the left, represented by arrow 602. In FIG. 6, dashed horizontal reference line 608 extending between leftmost point 610 and rightmost point 612. It will be understood that FIG. 6 is not drawn to scale and that the amount of lateral shifting of viewer 500 relative to vertical axis 620 has been exaggerated for ease of illustration. In actuality, leftmost position 610 and rightmost position 612 may each be within the range of from 1 cm. to 4 cm. from the center point indicated by vertical axis 620. Leftmost point 610 corresponds to point 510 in FIG. 5, and rightmost point 612 corresponds to point 512 in FIG. 5. For each movement cycle represented by FIG. 5, viewer 500 shifts to the right, stopping at point 612, then shifts to the left until reaching point 610 before finally shifting back to the right and returning to its centered starting position. This pattern repeats for every "two steps" by which the position of the viewpoint is moved forward. Thus, movement of the position of the viewpoint (represented by viewer 500) is accompanied by changes in the lateral location (along axis 608) of the viewpoint relative to the original vertical axis (620); the lateral location alternates between leftmost position 610 on one side of the vertical axis, and rightmost position 612 on the opposite side. In this way, the viewpoint simulates changes in a person's view due to positional changes in a person's head from side to side as a person moves in real life.

Figure 7:
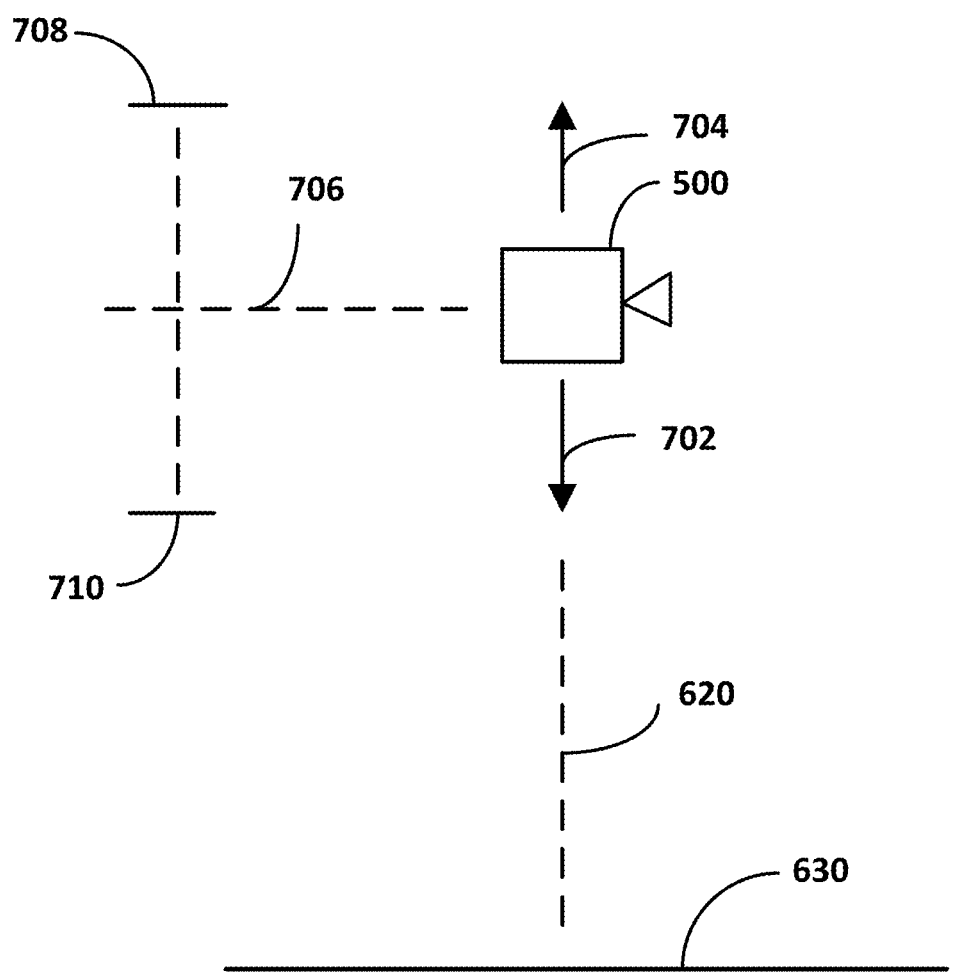
FIG. 7 illustrates movement of the viewpoint of FIGS. 5 and 6 in a vertical plane (up and down) along a vertical axis according to various embodiments of the invention.

FIG. 7 illustrates movement of the viewpoint of FIGS. 5 and 6 along a vertical axis (i.e., up and down) during such simulated head-bobbing movement. Once again, viewer 500 is shown located along vertical axis 620 above ground surface 630. Movement along vertical axis 620 is represented by Up arrow 704 and Down arrow 702. With viewer 500 at rest (i.e., when the position of the viewpoint in the displayed navigable environment is not moving), viewer 500 is initially positioned above ground surface 630 represented by horizontal axis 706 in FIG. 7. For an average person, this distance might correspond to approximately 70 inches above ground surface 630 within the navigable environment. During the head-bobbing motions shown in FIG. 5, the elevation of viewer 500 might rise upwardly to the point indicated by upward limit 708 in FIG. 7, and may also lower downwardly to the point indicated by downward limit 710. It will be understood that FIG. 7 is not drawn to scale and that the amount of vertical shifting of viewer 500 relative to horizontal axis 706 has been exaggerated for ease of illustration. In actuality, upward limit 708 may be within the range of from 1.5% to 4% greater than the initial elevational distance of viewer 500 above ground surface 630 (as represented by horizontal axis 706); likewise, downward limit 710 may be within the range of from 1.5% to 4% less than the initial elevational distance of viewer 500 above ground surface 630 (as represented by horizontal axis 706).

Upward limit 708 in FIG. 7 corresponds to points 502 and 504 in FIG. 5, and downward limit 710 corresponds to points 506 and 508 in FIG. 5. For each full movement cycle represented in FIG. 5, viewer 500 of FIG. 7 shifts upwardly from its initial centered position along horizontal axis 706 toward upward limit 708 (corresponding to point 504 in FIG. 5). Viewer 500 then moves downwardly to downward limit 710 (corresponding to point 508 in FIG. 5). Viewer 500 then moves back upwardly, passing its initial centered starting point until reaching upward limit 708 (corresponding to point 502 in FIG. 5). Viewer 500 then moves downwardly again to downward limit 710 (corresponding to point 506 in FIG. 5). Viewer 500 then moves upwardly again, until reaching its initial centered starting position. This pattern repeats for every "two steps" by which the position of the viewpoint is moved forward, and the frequency of such elevational shifts is again substantially proportional to the speed at which the position of the viewpoint is moved within the navigable environment.

Thus, movement of the position of the viewpoint (represented by viewer 500) is accompanied by changes in the elevational distance of the viewpoint above a reference plane (e.g., ground surface 630). During movement of the viewpoint position, the elevation of the viewpoint alternates between an upper elevational distance (which is greater than the initial elevational distance) and a lower elevational distance (which is less than the initial elevational distance); in this way, the viewpoint simulates changes in a person's view due to positional changes in a person's head up and down as a person moves in real life.

Figure 8:
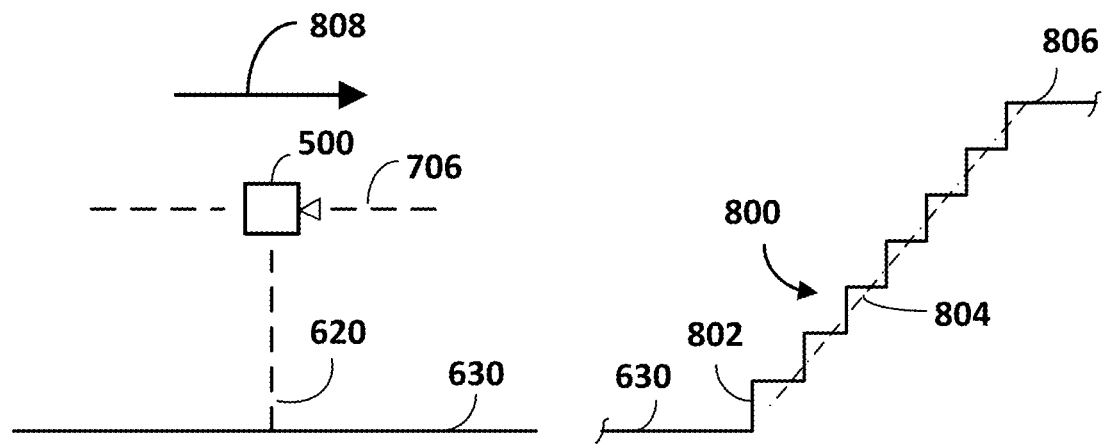
FIG. 8 illustrates movement of a viewpoint in space as the viewpoint approaches an upwardly-ascending stairway from a level starting point according to various embodiments of the invention.
Figure 9:
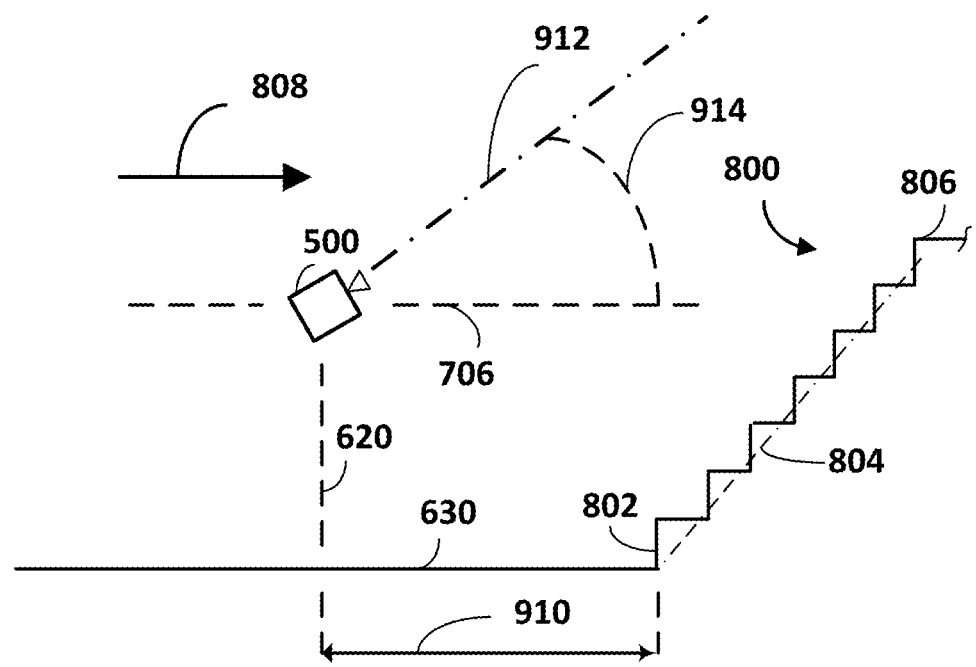
FIG. 9 illustrates upward tilting movement of the viewpoint of FIG. 8 as the viewpoint becomes proximate to the upwardly-ascending stairway according to various embodiments of the invention.

FIGS. 8 and 9 illustrate movement of the viewpoint in space as the viewpoint approaches an upwardly-ascending stairway from a level starting point. While shown in the form of a stairway, other ascending topographical features could be provided in the navigable environment, including for example, an upwardly inclined ramp, an upwardly extending ladder, an obstacle to be climbed over, etc. In FIGS. 8 and 9, the viewpoint displayed in the navigable environment is again represented by a viewer 500 that is moving in the direction shown by arrow 808. Viewer 500 is moving above level ground surface 630 and is centered over vertical axis 620. Viewer 500 is approaching an upwardly ascending stairway 800. Stairway 800 includes a first lower step having an edge 802 and includes an upper landing 806. Stairway 800 extends upwardly along an inclined axis designated by dashed line 804.

Initially, as shown in FIG. 8, viewer 500 is still somewhat remote from stairway 800 and has not yet become proximate to stairway 800. Accordingly, viewer 500 is oriented along horizontal axis 706; thus, the viewpoint displayed within the navigable environment is the view that would be seen by an observer with the observer's head held level, or by a video camera aimed straight ahead.

Now turning to FIG. 9, viewer 500 has come within threshold distance 910 between the vertical axis 620 of the viewer and edge 802 of the first step of stairway 800. As shown in FIG. 9, viewer 500 is now shown as being angled upwardly along viewing axis 912. This simulates the action normally taken by a human observer who is approaching an ascending stairway. Viewing axis 912 forms an angle with horizontal axis 706 designated by arc 914 in FIG. 9. In a corresponding manner, the elevational angle of the viewpoint within a navigable environment displayed on a user's touchscreen display 125 of a user's handheld device 110A (see FIG. 2B) would likewise be tilted upwardly by angle 914 when the position of the displayed viewpoint comes within threshold 910 of the front edge of such stairway. The distance represented by threshold 910 may be selected to be within the range of approximately 1.5 to 4 meters, as measured by the distances within the displayed navigable environment. The tilt angle 914 to which the viewpoint angle is tilted upwardly above the horizontal may be selected to be within the range extending approximately between 1 degree and 8 degrees. Thus, the displayed viewpoint simulates changes in a person's view resulting from a person tilting his or her head upward when approaching an ascending topographical feature in real life. Microprocessor 180 and navigation logic 140 can easily determine when the displayed viewpoint has come within the threshold 910 of an ascending topographical feature, and may implement such upward tilting of the elevational angle of the viewpoint. If desired, the degree of upward tilting may be a function of the height of the stairway, ramp, or other feature over which the position of the viewpoint will need to ascend as it continues moving forward.

Figure 10:
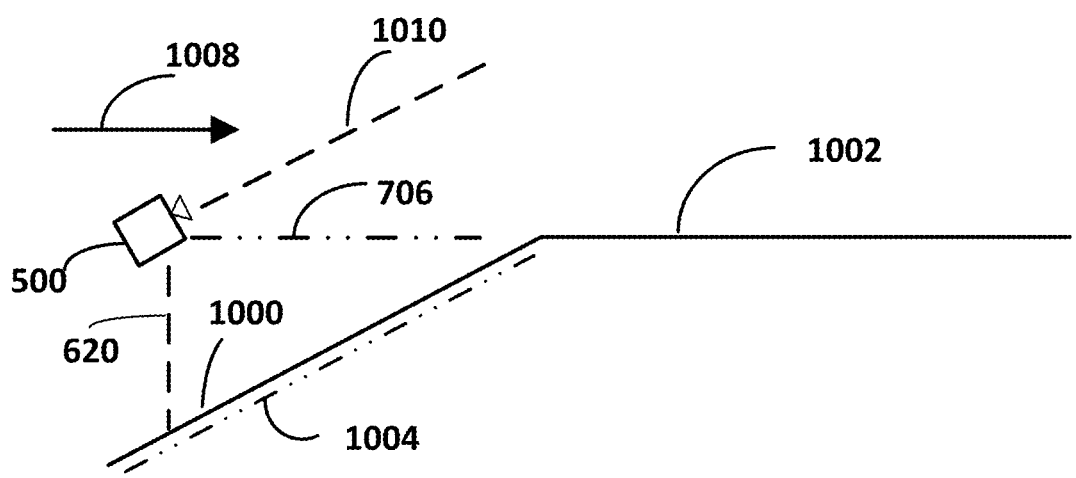
FIG. 10 illustrates movement of a viewpoint in space along an upwardly inclined path as the viewpoint approaches a substantially level support surface according to various embodiments of the invention.
Figure 11:
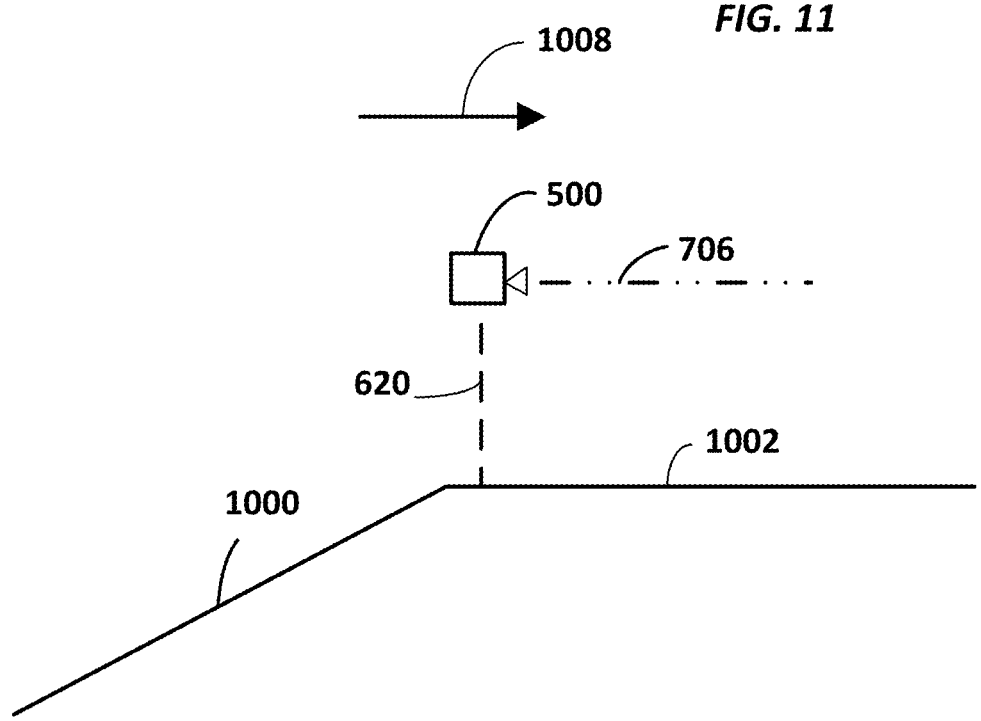
FIG. 11 illustrates return of the viewpoint of FIG. 8 to a level (horizontal) orientation as the viewpoint overlies the substantially level support surface according to various embodiments of the invention.

FIGS. 10 and 11 illustrate movement of the viewpoint in space as the position of the displayed viewpoint transitions from an upwardly inclined support surface back to a level support surface. In FIG. 10, viewer 500 is moving upwardly over ramp 1000 which extends along inclined axis 1004. The top of ramp 1000 leads to level support surface 1002. As shown in FIG. 10, viewer 500 is tilted upwardly along viewing axis 1010, relative to horizontal axis 706, for the reasons already explained above in conjunction with FIGS. 8 and 9.

As shown in FIG. 11, viewer 500 has transitioned from the top of inclined ramp 1000 to level support surface 1002. Accordingly, the viewing angle of viewer 500 is returned to extend along horizontal axis 706. Thus, the elevational angle of the viewpoint displayed on touchscreen 125 of a user's handheld device 110A (see FIG. 2B) returns to its usual "straight ahead" orientation. This auto-leveling feature again simulates what a human observer would do in real life upon reaching the top of an inclined ramp or stairway. While described in conjunction with an upwardly-inclined ramp, those skilled in the art that the same manner of auto-leveling of the displayed viewpoint may be implemented as the viewpoint position transitions from a downwardly-directed ramp or stairway, back to a level surface.

Figure 12:
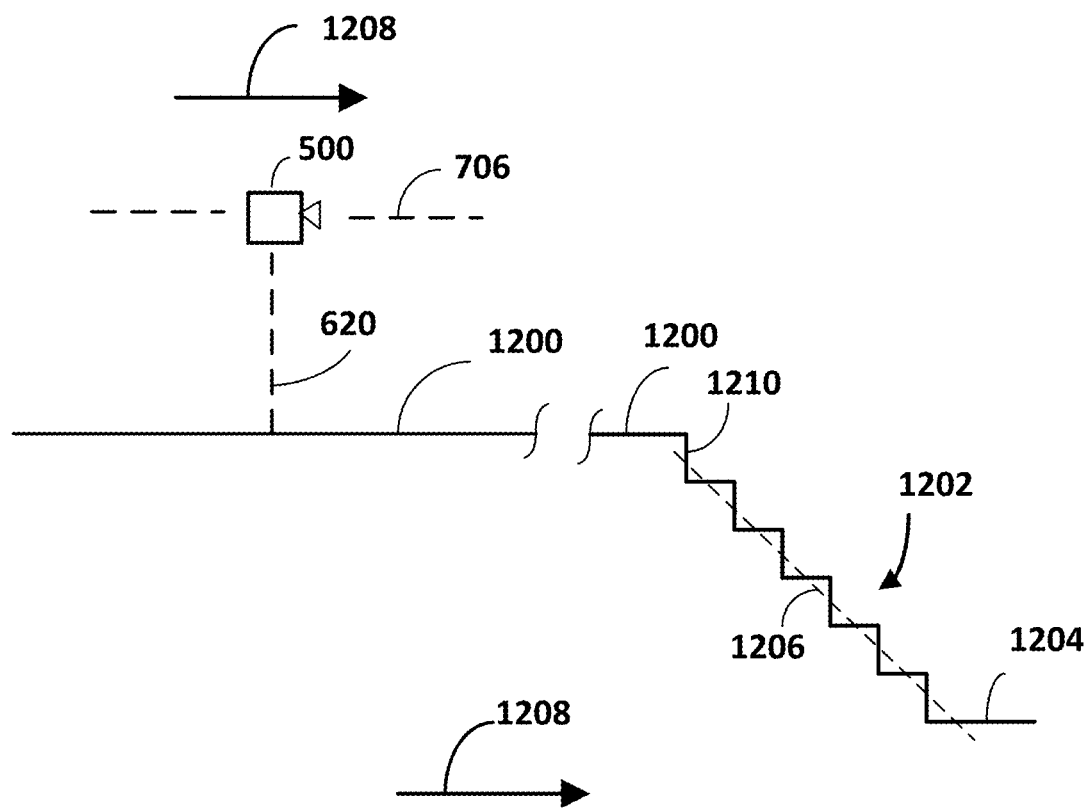
FIG. 12 illustrates movement of a viewpoint in space as the viewpoint approaches a downwardly-descending stairway from a level starting point according to various embodiments of the invention.
Figure 13:
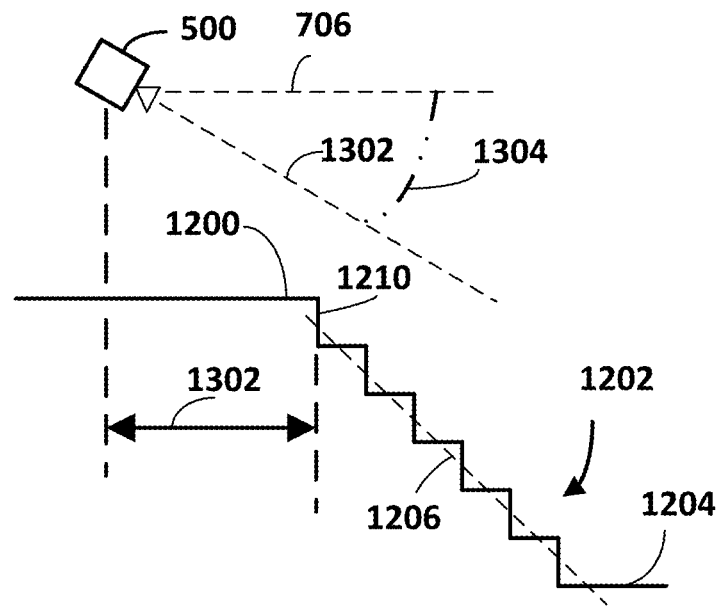
FIG. 13 illustrates downward tilting movement of the viewpoint of FIG. 12 as the viewpoint becomes proximate to the downwardly-descending stairway according to various embodiments of the invention.

FIGS. 12 and 13 illustrate movement of the displayed viewpoint in space as the position of the viewpoint approaches a downwardly-descending stairway from a level starting point. In FIGS. 12 and 13, level support surface 1200 leads to a downwardly-descending stairway 1202, which extends along inclined axis 1206 to bottom landing 1204. Stairway 1202 includes a leading edge 1208 of the first step downward step. As shown in FIG. 12, viewer 500 is moving over level support surface 1200 in the direction shown by arrow 1210 but is still relatively remote from leading edge 1208. Accordingly, viewer 500 is directed along horizontal axis 706 to present a "straight ahead" display image.

Turning now to FIG. 13, viewer 500 has approached proximate to stairway 1202, and has come within threshold distance 1302 of leading edge 1208 of stairway 1202. Accordingly, viewer 500 is tilted downwardly along viewing axis 1302, which forms an angle represented by arc 1304 with horizontal axis 706. This downward tilting action simulates changes in a person's view resulting from a person tilting his or her head downward when approaching a lowered surface, or descending surface, in real life. If desired, threshold distance 1302 may be selected to be within the range of approximately 1.5 to 4 meters as measured within the navigable environment being displayed on a user's touchscreen display 125. Also, if desired, the downward tilt angle 1304 may be selected to be within the range between approximately 2 degrees and 15 degrees; the selected tilt angle 1304 may be a function of the downward incline of the stairway, ramp, or other feature over which the position of the viewpoint will need to descend as it continues moving forward.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps.

What is claimed is:

1. A computing device comprising:
 a touchscreen display; and
 logic including a micro-processor and configured to:
  display an image of a navigable environment on the touchscreen display, the image characterized by a viewpoint having a position in the navigable environment, the navigable environment having a lower reference plane, and the viewpoint being located at an initial elevational distance above the lower reference plane when the viewpoint is at rest;
  receive touch information from the touchscreen display,
  filter the touch information to identify contact gestures requesting movement of the position of the viewpoint within the navigable environment along a selected angle in the navigable environment;
  vary the image on the touchscreen display to move the position of the viewpoint of the image in response to such contact gestures, wherein horizontal movement of the viewpoint is accompanied by changes in the elevational distance of the viewpoint above the reference plane, the elevational distance alternating between an upper elevational distance that is greater than the initial elevational distance and a lower elevational distance that is less than the initial elevational distance during movement of the viewpoint position;
  whereby the viewpoint simulates changes in a person's view due to positional changes in a person's head up and down as a person moves in real life.

2. The computing device of claim 1 wherein the upper elevational distance is substantially within the range of 1.5% to 4% greater than the initial elevational distance, and wherein the lower elevational distance is substantially within the range of 1.5% to 4% less than the initial elevational distance.

3. The computing device of claim 1 wherein the frequency with which the elevational distance alternates between the upper elevational distance and the lower elevational distance is substantially proportional to a speed of movement of the position of the viewpoint.

4. The computing device of claim 1 wherein:
the viewpoint is located above the lower reference plane about a vertical axis when the viewpoint is at rest; and
movement of the viewpoint is accompanied by changes in the lateral location of the viewpoint relative to the vertical axis, the lateral location alternating between a leftmost position on one side of the vertical axis, and a rightmost position on an opposite side of the vertical axis, during movement of the viewpoint position;
whereby the viewpoint simulates changes in a person's view due to positional changes in a person's head from side to side as a person moves in real life.

5. The computing device of claim 4 wherein the leftmost position and the rightmost position are each within the range of from 1 cm to 4 cm from the vertical axis.

6. The computing device of claim 4 wherein the frequency with which the lateral location of the viewpoint alternates between the leftmost and rightmost positions is substantially proportional to a speed of movement of the position of the viewpoint.

7. A computing device comprising:
a touchscreen display; and
logic including a micro-processor and configured to:
display an image of a navigable environment on the touchscreen display, the image characterized by a viewpoint having a position in the navigable environment, the navigable environment including at least first and second support surfaces, the first support surface lying substantially horizontal and the second support surface being elevated above the first support surface;
receive touch information from the touchscreen display,
filter the touch information to identify contact gestures requesting movement of the position of the viewpoint within the navigable environment along a selected angle in the navigable environment;
vary the image on the touchscreen display to move the position of the viewpoint of the image in response to such contact gestures;
wherein the viewpoint is directed substantially horizontally when the viewpoint is positioned over the first support surface and is remote from the second support surface; and
wherein the viewpoint tilts upwardly at an angle to the horizontal when the viewpoint is positioned over the first support surface and as the viewpoint moves horizontally and approaches proximate to the second support surface;
whereby the viewpoint simulates changes in a person's view resulting from a person tilting his or her head upward when approaching an elevated surface in real life.

8. The computing device of claim 7 wherein the viewpoint is tilted upwardly when the position of the viewpoint comes within approximately the range of 1.5 to 4 meters of the second support surface.

9. The computing device of claim 7 wherein the angle to the horizontal about which the viewpoint is tilted upwardly ranges from between 1 degree and 8 degrees.

10. A computing device comprising:
a touchscreen display; and
logic including a micro-processor and configured to:
display an image of a navigable environment on the touchscreen display, the image characterized by a viewpoint having a position in the navigable environment, the navigable environment including at least first and second support surfaces, the first support surface lying substantially horizontal at a first elevation, and the second support surface being at a lower elevation compared to the first elevation;
receive touch information from the touchscreen display,
filter the touch information to identify contact gestures requesting movement of the position of the viewpoint within the navigable environment along a selected angle in the navigable environment;
vary the image on the touchscreen display to move the position of the viewpoint of the image in response to such contact gestures;
wherein the viewpoint is directed substantially horizontally when the viewpoint is positioned over the first support surface and is remote from the second support surface; and
wherein the viewpoint tilts downwardly at an angle to the horizontal when the viewpoint is positioned over the first support surface and as the viewpoint moves horizontally and approaches proximate to the second support surface;
whereby the viewpoint simulates changes in a person's view resulting from a person tilting his or her head downward when approaching a lowered surface in real life.

11. The computing device of claim 10 wherein the viewpoint is tilted downwardly when the position of the viewpoint comes within approximately the range of 1.5 to 4 meters of the second support surface.

12. The computing device of claim 10 wherein the angle to the horizontal about which the viewpoint is tilted downwardly ranges from between 2 degrees and 15 degrees.

13. A computing device comprising:
a touchscreen display; and
logic including a micro-processor and configured to:
display an image of a navigable environment on the touchscreen display, the image characterized by a viewpoint having a position in the navigable environment, the navigable environment including at least first and second support surfaces, the second support surface lying substantially horizontal at a first elevation, and the second support surface being generally inclined to the horizontal and at a different elevation compared to the first elevation;
receive touch information from the touchscreen display,
filter the touch information to identify contact gestures requesting movement of the position of the viewpoint within the navigable environment along a selected angle in the navigable environment;
vary the image on the touchscreen display to move the position of the viewpoint of the image in response to such contact gestures;
wherein the viewpoint is directed at an angle to the horizontal when the viewpoint is positioned over the first support surface; and
wherein the viewpoint is re-directed horizontally when the position of the viewpoint transitions from the first support surface to the second support surface;
whereby the viewpoint simulates changes in a person's view resulting from a person leveling his or her head when transitioning to a horizontal surface from a surface directed along an incline in real life.

* * * * *